W. B. JOHNSON.
Grain-Drill.
No. 11,029.
Patented June 6, 1854.
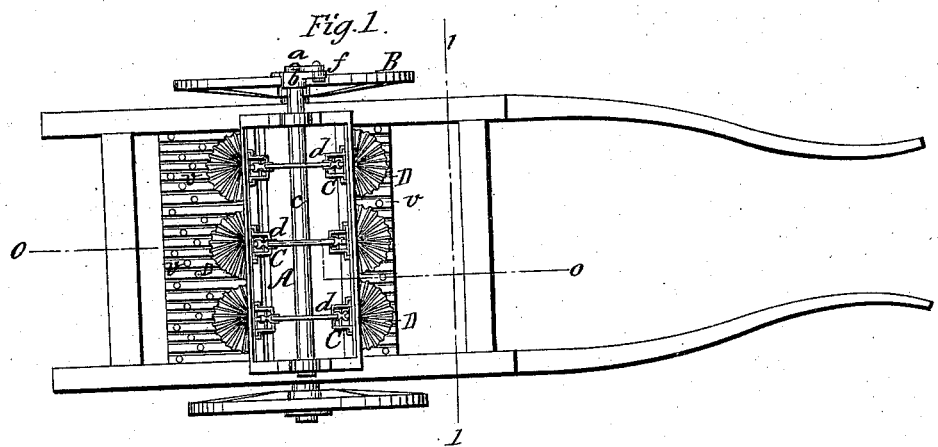
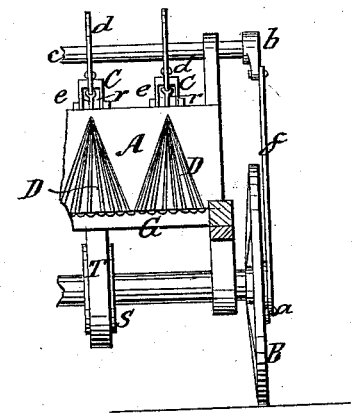
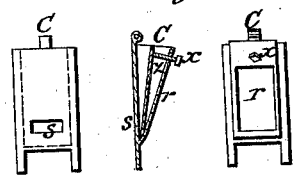

UNITED STATES PATENT OFFICE.

WILLIAM B. JOHNSON, OF STAUNTON, VIRGINIA.

IMPROVEMENT IN SEED-PLANTERS.

Specification forming part of Letters Patent No. 11,029, dated June 6, 1854.

*To all whom it may concern:*

Be it known that I, WILLIAM B. JOHNSON, of Staunton, in the county of Augusta and State of Virginia, have invented a certain new and useful Improvement in Seed-Planters, of which the following is full, clear, and exact description, reference being had to the drawings which accompany this specification, and in which—

Figure 1 represents a plan of my improved seed-planter; Fig. 2, an irregular longitudinal vertical section taken as denoted by the line *o o* in Fig. 1; Fig. 3, a transverse or end section in part through the line 1 1 in Fig. 1. Fig. 4 are front and back views and vertical section of one of the seed-buckets detached on an enlarged scale.

The improved planter which I am about to describe is for sowing seed broadcast; and it consists of a seed hopper or box, A, mounted on a wheeled truck or frame provided with shafts, to which may be hitched a horse or other cattle for drawing the machine across the field to be planted, the seed being distributed from the machine by it when in motion, as follows: A crank or wrist pin, *a*, projecting from the face of one of the running-wheels B, fast on the axle or otherwise connected with the carrying-wheel shaft, is linked by a pitman, *f*, to an upper crank, *b*, fast on a rocking shaft, *c*, that runs lengthwise of the seed-hopper, centrally over it, the said upper crank being of such throw as when connected, as specified, with the revolving-wheel shaft it is made to vibrate and give the necessary movement to the rocking shaft *c*. Double beams or opposite radial arms, *d*, are made fast to and project from the rocking shaft. These beams, which rock with their shaft, are connected at their ends by link-rods *e* to buckets C, which fit in guides on the inside faces of the hopper's sides and move vertically up and down by the rocking motion of the beams to which they are attached. These buckets work down into the seed in the hopper to take in seed through the opening or mouth in their top during the downward movement of either half of the double rocking beams, and deliver the seed from them over the top edges of the sides of the hopper through an opening, *s*, in the outside face of either bucket, toward the close of its ascent, by the upward movement of either opposite radial arm or half of the double beam *d* alternately. Thus the planter, as it is drawn across the field, causes the buckets (of which there may be any number) on the one side of the hopper to descend and take in seed and those on the opposite side to ascend and deliver the seed over the side of the hopper alternately and continuously. The capacity of these buckets may be a cubic inch, more or less. Their back or inside faces are made inclined or sloping to facilitate the entry of the buckets into the seed; and in order to adjust the distribution of the seed in large or small quantities, as required, the backs or inside faces of the buckets are made with an opening or cavity, *r*, in them, and false or inner backs, *z*, fitted loosely or hinged within the buckets at their bottom and adjusted nearer to or farther from the front face of the buckets by a set-screw, *x*, at the back, by which means the amount of seed lifted by the buckets is regulated at pleasure, as any seed entering the bucket in its descent behind the false or adjustable back will fall through into the hopper in the ascent of the bucket through the opening *r* in the back face of the bucket, and according to the proximity of the false back to the front face of the bucket will the amount of seed lifted by the bucket for distribution through the opening *s* be regulated. The seed, as it is discharged from the buckets on either side of the rocking shaft alternately through the front openings, *s*, in the buckets, over the top edges of the sides of the hopper—first one side and then the other, the rocking shaft keeping the buckets continuously ascending and descending—is caused to fall on grooved semi-cones D, or their equivalents, which serve to distribute, scatter, or spread the seed as it runs or falls down them onto a grooved reciprocating table or bed, G, that not only receives the seed as it runs from the semi-cones onto it, but by its reciprocating movement causes the semi-cones (as either end of the table alternately works under or toward them) to act as strikers to brush off the seed lying in the grooves on the face of the table. Each end of this reciprocating table G is perforated with apertures *v* for the discharge of the seed lying thereon, each groove in said table having one or more apertures, according to the length of the table when extended, from the semi-cones to its edge, which are so mathematically arranged in the several grooves as to insure an equal distribution of the seed on the ground, which takes place continuously from either side of the hopper alternately, the table advancing from under the semi-cones on the one side to receive seed while it is scattering seed by its receiving motion under the semi-cones on the other side of the hopper, so that no ground is traveled over by the machine without having the seed equally distributed over it, the reciprocating movement of the table being regulated to that of the seed-buckets, which are at their top stroke discharging seed on one side of the hopper, when the table has advanced to its full extent on that side, and the buckets on the opposite side of the hopper then being at their descent to take in seed, while the table on that side is furnishing its back or inward movement of scattering the seed to the ground. This reciprocating movement of the table in the direction of the travel of the machine may be effected by an eccentric, S, fast on the carrying-wheel axle, and operating against or within a strap, T, secured to the under side of the table.

The grooves in the semi-cones serve to separate the kernels of seed from clogging, and to distribute them in a spread or scattered form on the table, while the longitudinal grooves in the table receive the kernels as they fall or run down the furrows or grooves in the semi-cones and prevent the semi-cones from crowding the seed laterally during the inward movement of the table under them, the longitudinal grooves in the table thus acting as guides to distribute the seed to the ground in the same scattered or spread form it is laid upon the table, while the semi-cones act gradually and gently in removing or sowing the seed. The agitation produced by the buckets prevents all clogging of the seed in the hopper, and by the manner herein described of discharging the seed from the hopper from above instead of below, as is usual with other machines, clogging of the seed over the discharge-apertures by the weight of the seed above them is obviated. Instead of the semi-cones, flat, angular, or other shaped grooved inclined planes, or their equivalents, may be used; but I wish to be understood that I do not claim said grooved semi-cones or their equivalents separately and apart from the other devices herein specified and used in combination therewith by me, as I am aware that their equivalents have been used before by F. Vandoren, and are described in the specification of his seed-planter patented 13th of April, 1852.

Having thus described my invention, what I claim therein as new, and desire to secure by Letters Patent, is—

1. The method herein described of sowing seed broadcast by means of the ascending and descending buckets, grooved semi-cones or their equivalents, and reciprocating bed or table, constructed, arranged, and operating together substantially in the manner specified.

2. Constructing the seed-buckets with an open back, false or close adjustable inner back, for regulating the lifting capacity of the buckets, as herein set forth.

In testimony whereof I have hereunto subscribed my name this 18th day of February, 1854.

WM. B. JOHNSON.

Witnesses:
NICHELO KINNEY,
JAS. WALKER.